Sept. 11, 1934.  F. H. ADAMS  1,973,134
CUTTER FOR FORMING SPIRAL BEVEL GEARS
Filed Nov. 6, 1931  2 Sheets-Sheet 1
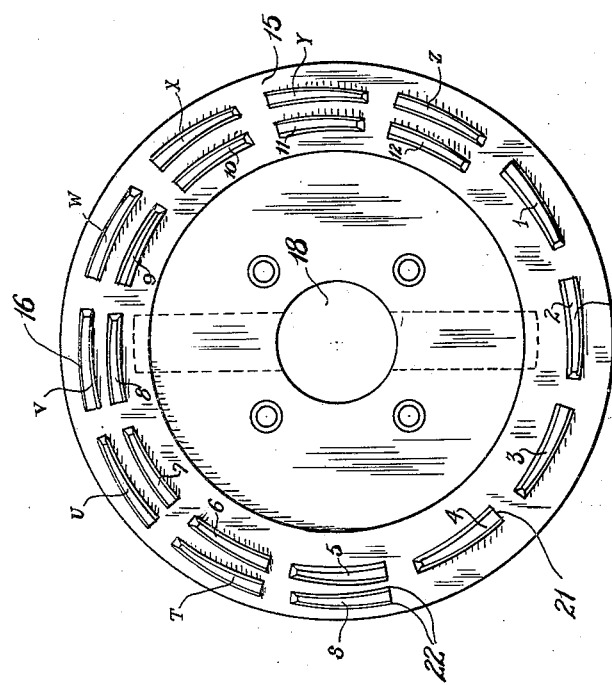
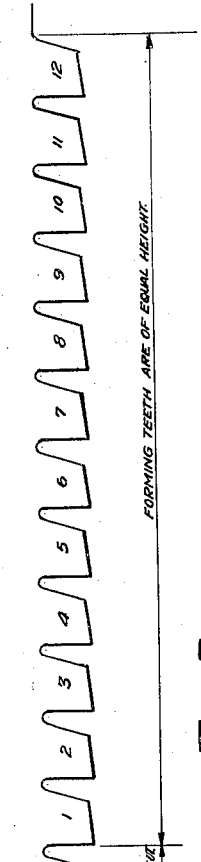
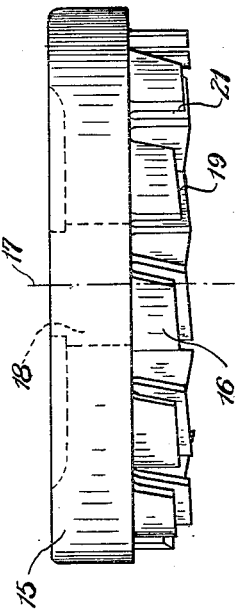
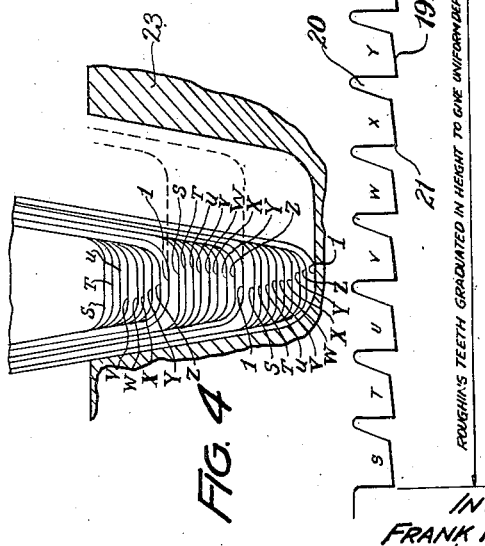
INVENTOR:
FRANK H. ADAMS
Kwis Hudson & Kent
ATTORNEYS.

Sept. 11, 1934.          F. H. ADAMS            1,973,134
              CUTTER FOR FORMING SPIRAL BEVEL GEARS
                   Filed Nov. 6, 1931       2 Sheets-Sheet 2
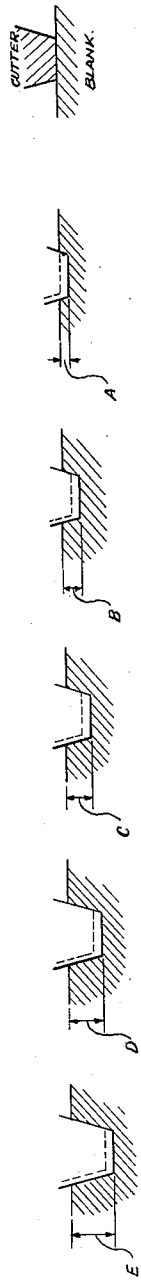
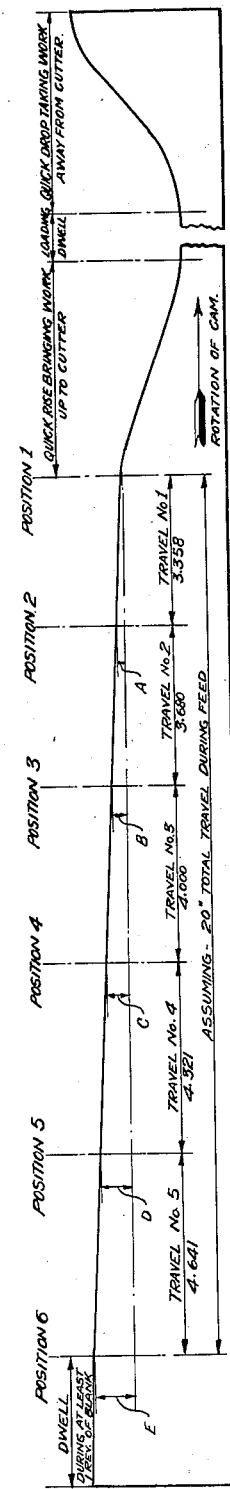
INVENTOR:
FRANK H. ADAMS
Kwis Hudson & Kent.
ATTORNEYS.

Patented Sept. 11, 1934

1,973,134

UNITED STATES PATENT OFFICE 1,973,134

CUTTER FOR FORMING SPIRAL BEVEL GEARS

Frank H. Adams, Cleveland Heights, Ohio, assignor to The Cleveland Hobbing Machine Company, Cleveland, Ohio, a corporation of Ohio Application November 6, 1931, Serial No. 573,452

19 Claims. (Cl. 29—103)

This invention relates to a cutter for forming spiral bevel gears or the like by a continuous process, that is by a process wherein the cutter and gear blank are rotated in continuous cutting engagement with each other and are given the requisite relative movements to effect the complete cutting or forming of the teeth in the blank.

An object of the invention is to provide a cutter for forming the teeth of spiral bevel gears or the like, by a continuous process, of such character that the teeth of the gears produced thereby will have characteristics corresponding with the tooth characteristics desired.

Another object is to provide a cutter for forming spiral bevel gears or the like by a continuous process, such that all of the forming teeth of the cutter will serve an equal function in producing interdental spaces in the gear blank of the desired width, depth, and contour.

A further object is to provide a cutter for forming spiral bevel gears or the like by a continuous process, wherein a continuous relative feeding movement between the cutter and gear blank may be employed during the cutting operation and the amount of metal removed from the blank by the cutter will be constant in any given period of time during the said cutting operation.

A further object of the invention is to provide a cutter for forming spiral bevel gears or the like by the hobbing process which is so constructed that its actual forming teeth will have a uniform depth of cut for each successive cutting movement through the gear blank during the entire cutting operation and notwithstanding the fact that a continuous relative feeding movement is imparted to the cutter and gear blank.

An additional object is to provide a novel cutter for the purpose specified which is so formed as to be subjected to a minimum of wear.

Further and additional objects and advantages of the invention will be apparent to those skilled in the art from the following detailed description of the preferred embodiment thereof described with reference to the accompanying drawings, in which Figure 1 is a bottom plan view of a cutter embodying the present invention.

Fig. 2 is an elevational view of the cutter shown in Fig. 1.

Fig. 3 is a diagrammatic developed view of the cutter teeth shown in Figs. 1 and 2.

Fig. 4 is a sectional view taken at the outer edge of one of the interdental spaces of the gear blank, and illustrating the manner in which the roughing teeth of the cutter act during the cutting operation.

Fig. 5 is a developed view of a cam for imparting a continuous relative feeding movement between the cutter and blank during the cutting operation, and of such character that the amount of metal removed during any given period in the cutting operation is constant, and Figs. 6, 7, 8, 9, 10 and 11 are sectional views showing successive positions of the cutter feeding into the blank, the dotted lines indicating the depth of cut in the preceding position, while the area removed between any two positions is the area included between the dotted and full lines.

The cutter may be used on variously constructed machines capable of imparting the requisite relative movements between the cutter and blank during the cutting operation, and of providing the required angular and other relative adjustments between the cutter and blank but, by way of illustration and in order to more clearly define the function and utility of the cutter and method, I prefer to describe the cutter and method as though used on and practiced with a multiple spindle hobbing machine, such as shown in my copending application Serial No. 535,340, filed May 6, 1931.

Briefly, the machine disclosed in my said copending application includes a rotatable turret carrying a plurality of units, each of which comprises a rotatable cutter spindle and a rotatable work spindle. The cutter spindle and work spindles of each unit are rotated at predetermined relative speeds by means of suitable gearing, etc. The ratio of the rotative speeds of the work and cutter spindles is determined by the number of teeth in the gear to be cut, as will later be pointed out. Each unit of the machine also includes provisions for adjusting the cutter spindle transversely of its axis, and for adjusting the work spindle angularly with respect to the axis of the cutter spindle, for the purpose of properly positioning the cutter and blank relative to each other so that the former will produce teeth in the blank of the proper characteristics.

The machine shown in said application also includes provision for enabling the work spindle of each unit to be moved in a direction parallel to the axis of the cutter spindle to effect the relative feeding movement between the cutter and blank during the cutting operation and a circular cam for effecting said movement of the work spindle during the rotation of the turret.

Referring to Figs. 1 and 2 of the drawings, it will be seen that the cutter comprises an annular disk-like member 15 from one face of which the cutting teeth, indicated generally at 16, extend in a direction generally parallel to the axis of rotation of the cutter, which axis is indicated by the line 17. The member 15 of the cutter is provided with a centrally disposed opening 18 adapted to receive the cutter spindle, to which it may be secured by any suitable means, as is well understood in the art. The teeth 16 of the cutter are arranged on a spiral, which will pass through adjacent interdental spaces and stay within the confines thereof.

The series of spirally arranged teeth 16 of the cutter constitute two portions, namely a roughing tooth portion, including the teeth S to Z inclusive, and a forming tooth portion including the remaining teeth of the series and numbered 1 to 12 inclusive. Although the teeth of the roughing tooth portion have been shown herein as eight in number, and the teeth of the forming tooth portion as twelve in number, making a total number of twenty teeth in the series, it is to be understood that the number of teeth in each portion could be varied as desired and that the number illustrated herein is simply by way of example or illustration. All of the teeth in the series have their sides inwardly tapered toward the outer ends of the teeth and toward the rear face thereof, and the outer ends of the teeth are given the required rake as indicated at 19. The tapered sides of the teeth and the end rake thereof, together with the transverse gashes 20 between the teeth, give the required clearance for the cutting action of the teeth as they pass through the tooth spaces of the gear blank. The junction of the sides and end faces of the teeth with the front face 21 thereof forms the cutting edges 22. The teeth of the roughing tooth portion are graduated in height from the tooth S to the tooth Z thereof, for a purpose later to be explained, and the teeth of the forming portion are all of equal height. The roughing teeth are all slightly thinner than the forming teeth and preferably increase gradually in thickness from tooth S to tooth Z. The forming teeth vary in thickness as follows: They increase gradually in thickness from tooth 1 to 5 inclusive and then decrease gradually toward tooth 12, tooth 5 being the thickest tooth of the forming teeth.

In the production of spiral bevel gears, the gear blanks are conical blanks of suitable form and are mounted on the work spindle of the machine with the apex of the gear cone lying in the line of the axis of the work spindle. The axis of the gear blank and the axis of the cutter are preferably angularly positioned relative to each other in an amount equal to the angle of bevel or root angle of the gear. The cutter and blank also are relatively arranged so that the root plane of the gear teeth, at the point where the cutter teeth pass through the blank, is perpendicular to the cutter axis. In addition the axes of the cutter and blank are offset with respect to each other so that the teeth of the cutter will have the proper cutting relationship with respect to the gear blank, which offset position of the cutter and blank axes is dependent upon the spiral angle of the gear to be cut.

When the cutter and blank have been properly adjusted with respect to each other, the proper relative speeds of rotation are imparted to the cutter and blank so that the cutting operation may commence as soon as the cutter and blank are moved into cutting engagement with each other. The proper rates of rotation of the cutter and blank are in the ratio of the number of teeth in the gear to be cut to one, that is, if there are thirty-two teeth in the gear to be cut, the cutter will rotate thirty-two times to every one revolution of the gear blank.

It will be apparent that, as the cutter and blank are rotated in the relationship indicated, the theoretical frustum which will pass through the interdental spacer of the finished gear and stay within the confines thereof will vary in width from zero to maximum and back to zero. The frustum tapers off faster at one end than at the other, due to the fact that the rotation of the blank tends to produce a relative increase or decrease of the interdental spacer, depending upon the relative direction of rotation between the cutter and blank and the direction the respective part of the frustum is extending or traveling across the interdental spaces. The cutter as illustrated is designed to operate on the machine shown in the aforesaid application and employs the same relative rotation illustrated. Therefore, the frustum tapers off less rapidly to the rear of the point of maximum width than to the front thereof, and the width of the teeth to the rear of tooth 5, which is located at or adjacent the point of maximum width of the theoretical frustum, decreases less rapidly than the teeth in front of tooth 5. As illustrated the teeth 16 are located on only a small part of the theoretical frustum and the roughing teeth are varied somewhat therefrom, although other arrangements may be employed.

In employing the cutter of the present invention for the production of spiral bevel gears, it is proposed to impart a continuous relative feeding movement to the cutter and gear blank during the cutting operation in a direction parallel to the axis of the cutter. Since the periphery of the tooth of the cutter in contact with the blank or the area of metal removed from the blank by the teeth of the cutter increases as the depth of the cut is increased, by the relative feeding movement between the cutter and blank, and it is desirable that the amount of metal removed during any given time interval in the cutting operation be kept constant so as to protect the teeth and increase the life of the cutter, it is proposed to impart a relative feeding movement to the cutter and blank during the feeding movement wherein the time interval between successive positions of the cutter and blank, indicated diagrammatically in Figs. 6 to 11, inclusive, is varied in the proper ratio.

As the depth of cut increases during the successive positions of the cutter feeding into the blank, the area of metal removed by the teeth increases in the manner illustrated in Figs. 8 to 13, inclusive, in which views the dotted lines indicate the depth of cut in the preceding position, and the area removed between any two successive positions is the area included between the dotted and full lines.

Fig. 5 of the drawings shows a diagrammatic developed view of a feed cam for imparting the desired relative feeding movement to the cutter and blank. The relative direction of rotation of the cam is indicated by the arrow, while the provision of a loading dwell, a quick rise to bring the blank up to the cutter, and a quick drop for taking the blank away from the cutter is shown at the right-hand end of the view. Assuming twenty inches to be the total travel during the feeding movement, it will be seen that the cam is so designed that the amount of travel between successive positions 1 to 6, inclusive, corresponding to Figs. 6 to 11, respectively, increases progressively from the initial position to the final position and that the ratio of such progression can be so computed that the amount of metal removed during any given time in the cutting operation will be constant. In other words, the rate of the feeding movement is progressively decreased from the beginning to the end of the cutting operation.

Assuming that the cutter is being used with the machine disclosed in the above mentioned application Serial No. 535,340, it will be understood that the desired feeding movement can be imparted to the gear blank by designing the feed cam so that the intervals between the successive positions of the cutter and blank may be gradually increased as the depth of the cut increases. It is to be understood, however, that, by referring herein to the use of the machine disclosed in my above mentioned copending application, I do not intend to restrict the subject matter of the present application to imparting the feeding movement to the gear blank, since it is evident that the feeding movement might be imparted to the cutter or to both the cutter and blank.

In order to protect the forming teeth and to prolong the life of the cutter roughing teeth S to Z are provided. As previously explained, the roughing teeth are graduated so as to increase in height from the tooth S to the tooth Z, and this last tooth is slightly less in height than the height of the forming teeth, which, are all of constant height. The ratio of the increase in height of the roughing teeth will, of course, vary in different instances, depending upon the character of work and tooth characteristics desired.

At the commencement of the cutting operation the roughing teeth perform no function, the cut being entirely performed by the forming teeth. However, as the depth of cut increases due to the relative feeding movement between the cutter and blank, the roughing teeth successively come into cutting action from the tooth Z to the tooth S. As the cutting operation proceeds after all of the roughing teeth have come into cutting action it will be seen that these roughing teeth each assume a portion of the cut, and the ratio of their increase in height is co-related to the ratio of feed. The rotation of the cutter and blank in cutting engagement first causes the forming teeth to mill out a series of shallow spiral grooves across the gear blank, the number of these grooves corresponding to the number of teeth desired in the gear and having a circular pitch corresponding to the lead of the series of spirally arranged teeth on the cutter. As previously mentioned the roughing teeth gradually come into cutting action until all of the teeth, both the roughing and the forming teeth, are performing their cutting function. The cutter and blank are continuously fed toward each other with a progressively decreasing feeding rate until the interdental spaces cut in the blank are of the desired depth. When this depth has been reached the feeding movement ceases and the cutter and blank are maintained in such position and are relatively rotated through a dwell period, preferably equal to one complete rotation of the blank, to level the depth of and to smooth off the cut and impart to all the gear teeth the same characteristics.

As previously explained, the forming teeth increase in width from tooth 1 to tooth 5 and then gradually decrease in width toward tooth 12, which latter tooth is approximately the same width as tooth 1. During the cutting operation the forming teeth 1 to 4 inclusive follow a path such that they cut into one side of the tooth space adjacent the outer circumference of the blank and at the opposite side thereof adjacent the inner circumference of the blank, the point at which their cutting action changes from one side of the tooth space to the other side progressively moving inwardly of the outer circumference of the blank from tooth 1 to 4 inclusive. Tooth 5, the widest of the forming teeth, follows a path such that it cuts upon both sides of the tooth spaces in the blank, while forming teeth 6 to 12 inclusive, cut first upon one side of the tooth space in the blank and then upon the opposite side thereof in inverse order to teeth 1 to 4 inclusive, the points at which their cutting action changes moving from the center of the tooth spaces outwardly toward the circumferences of the blanks. From the foregoing description it will be apparent that by modifying the teeth of the cutter and/or the relationship of the cutting edges 22 to the theoretical cutting frustum any desired tooth form may be produced.

Fig. 4 shows the cutter being fed to full depth in three steps as by a stepped cam. The blank is indicated in general by the reference character 23 and the interdental space is shown in its ultimate finished form. The positions in which the roughing teeth emerge from the interdental spaces at each of the three steps is shown in full lines and the grooves cut by the forming teeth during the first two feed steps are shown in dotted lines. During the last step the forming teeth cut to the ultimate tooth form.

Although a preferred embodiment of the invention has been illustrated and described herein, it should be understood that the invention is susceptible of various modifications and adaptations within the scope of the appended claims.

Having thus described my invention I claim:

1. A gear cutter comprising a rotatable member having a series of spirally arranged cutting teeth projecting therefrom in a direction generally parallel to the axis of rotation of said member, said series of teeth comprising a roughing tooth portion arranged at the beginning of the series and a forming tooth portion arranged at the end of the series, a plurality of the teeth of the roughing tooth portion progressively increasing in height from the leading end of said portion towards the rear end thereof, and a plurality of the teeth of the forming tooth portion being of constant height and of variable thickness.

2. A gear cutter comprising a rotatable member having a series of spirally arranged cutting teeth projecting therefrom in a direction generally parallel to the axis of rotation of said member, a portion of said series of teeth progressively increasing in height toward the rear of said series and another portion thereof being of constant height, the teeth of said first named portion being of less width than the teeth of said last named portion.

3. A gear cutter comprising a rotatable member having a series of spirally arranged cutting teeth projecting therefrom in a direction generally parallel to the axis of rotation of said member with a lead equal to the circular pitch of the gear to be cut, a portion of said series of teeth being of variable height and another portion thereof being of constant height, and the teeth of said first named portion being of less width than the teeth of said last named portion.

4. A gear cutter comprising a rotatable member having a series of spirally arranged cutting teeth projecting therefrom in a direction generally parallel to the axis of rotation of said member, said series of teeth comprising a roughing tooth portion and a forming tooth portion, the teeth of the roughing tooth portion being variable in height and the teeth of the forming tooth portion being of constant height and increasing in width from the first tooth of said portion to an intermediate tooth thereof.

5. A gear cutter comprising a rotatable disk member having a series of spirally arranged cutting teeth projecting from a face thereof in a direction generally parallel with the axis of rotation of said member, said series of teeth comprising a roughing tooth portion and a forming tooth portion, the teeth of the roughing tooth portion being variable in height and the teeth of the forming tooth portion being constant in height, the teeth of said last named portion increasing in width from the first tooth of the portion to an intermediate tooth thereof and then decreasing in width toward the last tooth of said portion.

6. A gear cutter comprising a rotatable disk member having a series of spirally arranged cutting teeth projecting from a face thereof in a direction generally parallel with the axis of rotation of said member with a lead equal to the circular pitch of the gear to be cut, said series of teeth comprising a roughing tooth portion arranged at the beginning of the series with the teeth thereof of gradually increasing height from the first to the last tooth of said portion and a forming tooth portion following said roughing tooth portion with the teeth thereof of a constant height greater than the longest tooth of the roughing tooth portion, the teeth of the forming tooth portion gradually increasing in width from the first tooth of the portion to an intermediate tooth thereof and then gradually decreasing in width toward the last tooth of said portion, the teeth of the roughing tooth portion being of less width than the narrowest tooth of the forming tooth portion.

7. A gear cutter comprising a rotatable member having a plurality of spirally arranged teeth projecting therefrom in the general direction of the axis of rotation of said member, cutting edges on the sides of a plurality of said teeth, the distance of said cutting edges from a spiral which will pass through interdental spaces of the gear to be cut gradually increasing towards the rear of said spirally arranged teeth.

8. A gear cutter comprising a rotatable member having a series of spirally arranged teeth projecting therefrom in the general direction of the axis of rotation of said member, cutting edges on one side of a plurality of said teeth, the distance of said cutting edges from a spiral which will pass through interdental spaces of the gear to be cut gradually increasing toward the rear of said series of teeth.

9. A gear cutter for cutting spiral bevel gears comprising a rotatable member having a series of spirally arranged teeth projecting therefrom in the general direction of the axis of rotation of said member, cutting edges on one side of a plurality of said teeth, the distance of said cutting edges in a plane normal to the axis of rotation of said member from a spiral in said plane which will pass through adjacent interdental spaces of the gear to be cut gradually increasing towards the rear of said series of teeth.

10. A gear cutter for cutting spiral bevel gears when continuously rotated in cutting relationship with a continuously rotating spiral bevel gear blank comprising a rotatable member having a plurality of spirally arranged teeth projecting therefrom in the general direction of the axis of rotation of said member, cutting edges on the sides of a plurality of said teeth for forming a tooth profile of the gear to be cut, the distance of said cutting edges in a plane normal to the axis of rotation of said member from a spiral located in said plane and which will pass through interdental spaces of the gear to be cut gradually increasing towards the rear of said spirally arranged teeth.

11. A gear cutter for cutting spiral bevel gears when continuously rotated in cutting relationship with a continuously rotating spiral bevel gear blank comprising a rotatable member having a plurality of spirally arranged teeth projecting therefrom in the general direction of the axis of rotation of said member, cutting edges on the sides of a plurality of said teeth for forming the tooth profiles of the gear to be cut, the distance of said cutting edges in a plane normal to the axis of rotation of said member from a spiral located in said plane and which will pass through adjacent interdental spaces of the gear to be cut gradually increasing from either end of said spirally arranged teeth to an intermediate tooth thereof.

12. A gear cutter comprising a rotatable member having a series of spirally arranged cutting teeth projecting therefrom in a general direction parallel with the axis of rotation of said member, a plurality of said teeth being of constant height and variable width.

13. A gear cutter comprising a rotatable member having a series of spirally arranged cutting teeth projecting therefrom in a general direction parallel with the axis of rotation of said member, a plurality of said teeth being of constant height and increasing in width from one end of said series to an intermediate tooth thereof.

14. A gear cutter comprising a rotatable member having a series of spirally arranged cutting teeth projecting therefrom in a general direction parallel with the axis of rotation of said member, a plurality of said teeth increasing in width from the leading end of said series to an intermediate tooth thereof and then decreasing in width towards the rear end of said series.

15. A gear cutter comprising a rotatable member having a series of cutting teeth aranged in a spiral the lead of which is equal to the circular pitch of the gear to be cut and projecting from said member in a direction generally parallel to the axis of rotation thereof, a plurality of said teeth being of constant height and variable thickness.

16. A gear cutter comprising a rotatable member having a series of cutting teeth arranged in a spiral the lead of which is equal to the circular pitch of the gear to be cut and projecting from said member in a direction generally parallel to the axis of rotation thereof, said series of teeth comprising a roughing tooth portion arranged at the beginning of the series followed by a forming tooth portion arranged at the end of the series, a plurality of the teeth of the forming tooth portion being of constant height and variable thickness.

17. A gear cutter comprising a rotatable member having a series of cutting teeth arranged in a spiral the lead of which is equal to the circular pitch of the gear to be cut and projecting from said member in a direction generally parallel to the axis of rotation thereof, said series of teeth comprising a roughing tooth portion followed by a forming tooth portion the teeth of the roughing tooth portion being variable in height and the teeth of the forming tooth portion being of constant height and variable width.

18. A gear cutter for cutting spiral bevel gears adapted to be continuously rotated in cutting relationship with a continuously rotating spiral bevel gear blank, comprising a rotatable member having a plurality of spirally arranged teeth projecting therefrom in the general direction of the axis of rotation of said member, cutting edges on the sides of a plurality of said teeth for forming a tooth profile of the gear to be cut, the distance of said cutting edges in a plane normal to the axis of rotation of said member from a spiral located in said plane and having a lead equal to the circular pitch of the gear to be cut gradually increasing towards the rear of said spirally arranged teeth.

19. A gear cutter for cutting spiral bevel gears adapted to be continuously rotated in a cutting relationship with a continuously rotating spiral bevel gear blank, comprising a rotatable member having a plurality of spirally arranged teeth projecting therefrom in the general direction of the axis of rotation of said member, cutting edges on the sides of a plurality of said teeth for forming the tooth profile of the gear to be cut, the distance of said cutting edges in a plane normal to the axis of rotation of said member from a spiral located in said plane and having a lead equal to the circular pitch of the gear to be cut gradually increasing from either end of said spirally arranged teeth to an intermediate tooth thereof.

FRANK H. ADAMS.